April 30, 1940. J. E. HARVEY, JR., ET AL Re. 21,438
PROCESS OF PRODUCING WOOD PRESERVATIVE
Original Filed March 16, 1937
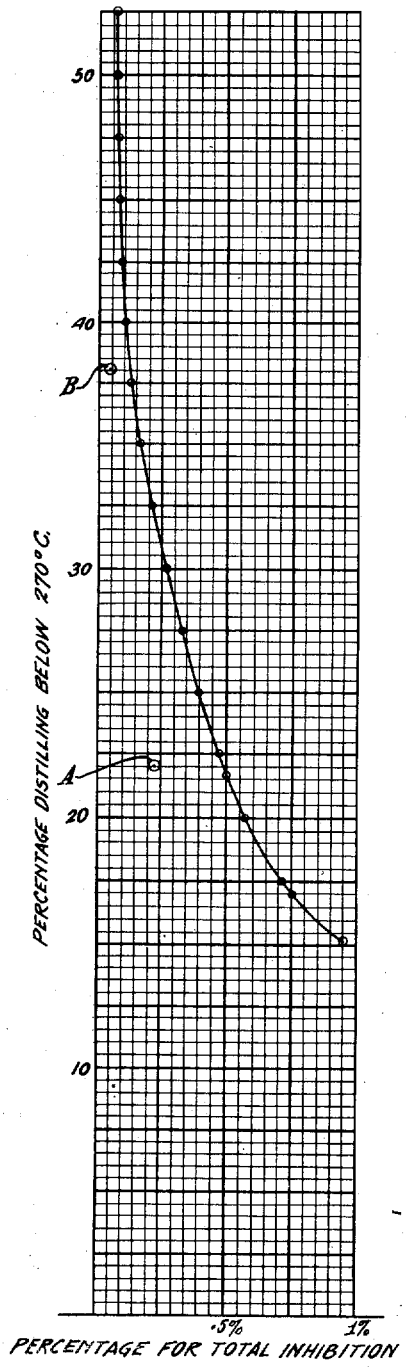
Inventors
Jacquelin E. Harvey Jr.,
Robert H. White Jr. and
John J. White
By Brown & Pluefs
Attorneys Reissued Apr. 30, 1940

Re. 21,438

UNITED STATES PATENT OFFICE 21,438

PROCESS OF PRODUCING WOOD PRESERVATIVE

Jacquelin E. Harvey, Jr., Robert H. White, Jr., and John J. White, Atlanta, Ga., assignors of one-half to Southern Wood Preserving Company, Atlanta, Ga., a corporation of Georgia, and one-half to said Jacquelin E. Harvey, Jr., Atlanta, Ga.

Original No. 2,125,918, dated August 9, 1938, Serial No. 131,232, March 16, 1937. Application for reissue October 7, 1938, Serial No. 233,878

12 Claims. (Cl. 134—78.6)

The invention relates to a process for preparation of wood preservative impregnant of the oil of creosote type and has as an object the provision of a process for preparation of such an oil from coke oven tar, water gas tar, producer gas tar, wood tar, and pitches derived from the named materials.

It is an object of the invention to produce from any of the materials named, some of which have no or substantially no toxicity, a wood preservative impregnant having superior toxic properties.

It is a further object of the invention to improve upon former processes of preparation of wood preservatives of the creosote type from the various pitches.

It is a further object of the invention to convert tar, especially coal tar in its entirety, into an acceptable wood preservative of the creosote-coal tar solution type without distillation.

In the drawing accompanying and forming a part of this application, the figure illustrates the percentages of impregnant to wood required for total inhibition of growth of wood-destroying organisms.

The invention depends upon three discoveries:

First: That toxicity is induced into any of the starting materials mentioned by hydrogenation thereof, and therefore starting material having toxic properties will have these properties enhanced by the process of the invention;

Second: That when dealing with the materials named, hydrogenation is preferential upon the high boiling fractions, as a result of which principle together with that stated in the foregoing paragraph, it is possible to change tar, and especially coal tar in its entirety, to a wood preservative having acceptable toxic and other properties;

Third: That the pitches respond more favorably to hydrogenation if mixed with solvents therefor, one result being that undue polymerization is reduced or avoided.

In Patent No. 2,082,885 granted to Jacquelin E. Harvey, Jr., one of the applicants herein, which application was co-pending herewith, there is described and claimed a process for producing a wood preservative from pitches. It was known prior to the said invention of Harvey, that any of the hydrocarbons mentioned herein could be hydrogenated, but applicants do not know that wood preservatives were ever before made by hydrogenation of these hydrocarbons, nor had the requirements for success in this industry ever been disclosed.

The tars mentioned above are the result of removing water and the lightest fractions from the liquor derived from distillation of coal, wood or crude sap of trees. In the case of coal tar the material has usually been treated to 200° C. and therefore has substantially no low ends boiling below 210° C. By reason of the preferential action of hydrogenation, above referred to, coal tar may be hydrogenated until no more than substantially 5% will distill at 210° C. and by so doing very greatly reduce the residue at 380° C. Thus a wood preservative may be produced falling within the specifications of the American Wood Preservative Association for creosote-coal tar solution, and this without distillation.

The said specifications are referred to by American Wood Preservative Association as Dewey S47, Class 5d, and are as follows:

1. The solution shall be a coal tar product of which at least 80% shall be of coal-gas tar or coke oven tar, and the remainder shall be refined or filtered coal-gas tar or coke-oven tar. It shall comply with the following requirements:

2. It shall not contain more than 3% water.

3. It shall not contain more than 2% of matter insoluble in benzol.

4. The specific gravity of the solution at 38 C. compared with water at 15.5 C. shall not be less than 1.05 or more than 1.12.

5. The distillate, on a water-free basis, shall be within the following limits: Up to 210 C., not more than 5%; up to 235 C., not more than 25%.

6. The solution shall yield not more than 6% coke residue.

7. The foregoing tests shall be made in accordance with the standard methods of the American Wood Preservative Association (see Manual-Creosote, analysis).

An example of the production of a wood preservative falling within these specifications, without distillation is as follows:

*Example 1.*—A coal tar, as for instance coke oven tar, having substantially no ends boiling below 210 C. and having a coke residue of 16% or over, is subjected to hydrogenation at substantially 400 C. and 200 atmospheres pressure for such a time that tests show that substantially 5% distills at 210 C. It will then be found that the coke residue has been reduced to 6% or less and that not more than 25% distills at 235 C., and that the water content, the benzol solubility and specific gravity will come within the specifications quoted.

It is difficult to specify the time required for this reaction. In the absence of a catalyst, the time of treatment is found to fall between four and eight hours, and with the best catalyst available from one to four hours are required.

The coal tar thus treated has toxic properties which as well understood in the creosote industry pass to the creosote when the latter is stripped. Due to the fact that hydrogenation is preferential on the higher boiling fractions and to the fact that hydrogenation induces toxicity, the procedure outlined in Example 1 has the effect of condensing the range of the boiling points of the fractions from the high boiling end toward the low, of giving toxicity to the high boiling ends which had none initially and to reduce the coke residue sufficiently to bring the entire material within the specifications of an acceptable wood preservative.

*Example 2.*—Any of the tars mentioned herein may be hydrogenated under the conditions specified in Example 1 until test samples removed show that the high boiling ends come within creosote specifications for percentage off at a specified temperature, and that the residue at a specified temperature falls within said specifications, when the hydrogenation is stopped and the material stripped of low boiling ends below 210° C.—or whatever low temperature is specified by the specifications.

Due to the preferential action of the hydrogenation it is found that usually not more than 10% will be distillable at 210° C. When the increase due to the absorption of hydrogen is taken into account the end product of acceptable creosote will be found to be substantially volume for volume with the starting tar.

In the production of wood preservative from any of the pitches mentioned, applicants' experiments have shown that certain ills in working develop, particularly polymerization, which it is desired to avoid, and the clogging of lines and valves. It is found that if the pitches are treated in the presence of cut-back solvents therefor, these ills are avoided. In fact it may be said that tar itself is pitch mixed with a solvent. The solvent, by increasing the volume of the material, reduces the concentration of coke residue or free carbon to a point where the said ills do not develop.

The discovery of the invention may be applied as follows:

*Example 3.*—Using coal tar pitch, which is a high boiling residue after removing creosote oil from coal tar, having a coke residue of substantially 30%, the pitch is liquefied by heat and dissolved in a suitable solvent such as petroleum or light fractions of tar, which solvent may be substantially inert to liquid phase hydrogenation, particularly in view of the fact that hydrogenation is preferential.

The mixture of pitch and solvent is then hydrogenated at from 350° C. to 500° C. and at a pressure of between 100 and 200 atmospheres until test samples withdrawn show that the percentage of low boiling ends in the mixture is substantially as great as permissible in the wood preservative.

The thus treated mixture is then distilled up to an upper limit such as to take off the permissible fraction of high boiling ends. In the example stated substantially all of the solvent will go over in the desired product. In the case of using a petroleum solvent, the distillation step may result in the recovery of some of the solvent as such, which may then be reused as solvent.

In the event that the distillation step results in a residue not permissible in the desired product, this residue may be again dissolved as before and again hydrogenated and distilled, to the end that total conversion is secured, neglecting manufacturing losses.

It is found that pitches having a coke residue of less than substantially 24% can be completely converted to creosote oil by the process described in the patent to J. E. Harvey, Jr., No. 2,082,885 above referred to, without difficulty arising from polymerization. When the coke residue is above substantially 24% it is desirable to use a solvent for efficient working. Even a small amount of solvent has surprisingly beneficial results and up to volume for volume of solvent compared with the pitch may be used.

*Example 4.*—Coke oven tar is placed in a reaction chamber and hydrogenation started at a pressure of from 100 to 200 atmospheres pressure and a temperature 250 to 450° C. At the same time circulation of the material is begun to a still heated to substantially 380° C. and the residue from said still is continually returned to the reaction chamber together with new coal tar pitch and combined with a portion of the distillate from said still.

The circulation is so adjusted that hydrogenation is limited to production of low boiling ends such that not more than 5% of the distillate from the still will distill at 210° C. and that the volume of the material in the reaction chamber will be maintained.

Referring further to the inducing of toxicity by hydrogenation: In the drawing there is shown a curve drawn with ordinates indicating the percentage ratio of the weight of wood preservative to the wood for total inhibition, and is the curve constructed for this purpose by the Forest Products Laboratory of the United States Department of Agriculture, as applying to all coal tar products. The abscissae of the curve are the percentages of the material distilling below 270° C.

In the figure there is shown for comparison with the standard curve, the percentage of applicants' hydrogenated wood preservative required for total inhibition. As indicated at A applicants' material distilling 22% below 270° C. requires but substantially .2 of one per cent instead of substantially .5 of one per cent as shown by the standard curve. As indicated at B applicants' material distilling 38% below 270° C. requires but .015 of one per cent as compared with .03 of one per cent as shown by the standard curve. This result was totally unpredictable.

Minor changes may be made in the steps of the process within the scope of the appended claims without departing from the spirit of the invention.

I claim:

1. The process of producing wood preservative impregnant of the creosote-coal tar solution type from a mixture of tar fractions including a preponderance of fractions boiling above 210° C. and with coke residue in excess of 10%, which comprises: hydrogenation of the mixture with temperature, pressure, and time of reaction so controlled as to produce an oil of the creosote-coal tar solution type; by preferential action of said hydrogenation on the high boiling point fractions reducing the percentage of coke residue in the mixture and condensing the range of boiling points of fractions of the mixture toward the low boiling point limits thereof; and by effect of hydrogenation increasing the toxic properties of the material.

2. The process of producing wood preservative impregnant of the creosote-coal tar solution type which comprises: hydrogenating tar having a coke residue in excess of 10% and having relatively low toxic properties and too great viscosity for satisfactory use as a wood preservative impregnant; said hydrogenation conducted under time, temperature and pressure conditions controlled to reduce the coke residue to conform to an oil of the creosote-coal tar solution type; whereby to induce toxic properties and reduction of viscosity; and stripping the hydrogenation product of any percentage of low boiling ends necessary to make the product conform as stated.

3. The process of producing wood preservative impregnant which comprises: mixing pitch having a coke residue in excess of 24% with a volume of cut-back solvent sufficient to provide a mixture of fractions with boiling points above substantially 210° C. and a coke residue below 24%; hydrogenating the mixture at a temperature between substantially 350° C. to 500° C. and at a pressure between 100 and 200 atmospheres until a distillate of the hydrogenation product distills not more in its lower boiling range nor has a coke residue higher than conforms to a creosote-coal tar wood preservative impregnant; and distilling the hydrogenation product to secure the desired product as a distillate.

4. The process of producing wood preservative impregnant which comprises: mixing pitch having a coke residue in excess of 24% with a volume of cut-back solvent sufficient to provide a mixture of fractions with boiling points above substantially 210° C. and a coke residue below 24%; hydrogenating the mixture at a temperature between substantially 350° C. to 500° C. and at a pressure between 100 and 200 atmospheres until a distillate of the hydrogenation product distills not more in its lower boiling range nor has a coke residue higher than conforms to a creosote-coal tar wood preservative impregnant; distilling the hydrogenation product to secure the desired product as a distillate; adding solvent to the residue of the distillation in quantity sufficient to again provide a mixture of fractions having a coke residue below 24%; and repeating the hydrogenation and distillation steps on the mixture.

5. The process of claim 4 in which the solvent used is a coal tar fraction.

6. The process of producing a wood preservative impregnant which comprises: distilling coal tar having no substantial percentage of ends distilling at 210° C. at a temperature between 350° C. and 400° C.; continuously circulating residue from the still to a hydrogenation reaction chamber held under a temperature between substantially 350° C. and 500° C. and at a pressure between substantially 100 and 200 atmospheres and continuously circulating the hydrogenation product from said reaction chamber to said still; continuously adding a portion of the distillate from said still to the residue passing to the reaction chamber in volume to maintain a mixture of fractions having a coke residue not in excess of 24%; and so adjusting the rate of circulation that the distillate from the hydrogenation product shall distill in its lower boiling range no more than conforms to a creosote-coal tar wood preservative impregnant; and distilling the hydrogenation product to secure the desired product as a distillate.

7. The process of producing wood preservative impregnant of the creosote oil type from a mixture of tar fractions with boiling points above 210° C. and with coke residue in excess of 10%, which comprises: hydrogenation of the mixture with temperature, pressure, and time of reaction so controlled as to produce not more than 5% of fractions distilling at 210° C.; by preferential action of said hydrogenation on the high boiling point fractions reducing the percentage of coke residue in the mixture and condensing the range of boiling points of fractions of the mixture toward the low boiling point limits thereof; and by effect of hydrogenation increasing the toxic properties of all fractions.

8. The process of producing wood preservative impregnant creosote which comprises hydrogenating tar having a coke residue in excess of 10% and having relatively low toxic properties and too great viscosity for satisfactory use as a wood preservative impregnant; said hydrogenation conducted under time, temperature and pressure conditions controlled to reduce the coke residue to not substantially in excess of 6%; whereby to induce toxic properties and reduction of viscosity; and stripping the hydrogenation product of low boiling ends to leave not more than 5% distilling at 210° C.

9. The process of producing preservative impregnant creosote which comprises: mixing pitch having a coke residue in excess of 24% with a volume of cut-back solvent sufficient to provide a mixture of fractions with boiling points above 210° C. and a coke residue below 24%; hydrogenating the mixture at a temperature between substantially 350° C. to 500° C. and at a pressure between 100 and 200 atmospheres until a distillate of the hydrogenation product distills not more than 5% at 210° C. and has a coke residue of not over 6%; and distilling the hydrogenation product to an upper limit of 380° C. to secure the desired product as a distillate having a coke residue of not over 2%.

10. The process of producing wood preservative impregnant creosote which comprises: mixing pitch having a coke residue in excess of 24% with a volume of cut-back solvent sufficient to provide a mixture of fractions with boiling points above 210° C. and a coke residue below 24%—hydrogenating the mixture at a temperature between substantially 350° C. to 500° C. and at a pressure between 100 and 200 atmospheres until a distillate of the hydrogenation product distills desired product as a distillate having a coke residue to not over 6%; distilling the hydrogenation product to an upper limit of 380° C. to secure the desired product as a distillate having a coke residue to not over 2%; adding solvent to the residue of the distillation in quantity sufficient to again provide a mixture of fractions having a coke residue below 24%; and repeating the hydrogenation and distillation steps on the mixture.

11. The process of claim 9 in which the solvent used is a coal tar fraction.

12. The process of producing a wood preservative impregnant creosote which comprises: distilling coal tar having substantially no ends distilling at 210° C. at a temperature between 350° C. and 400° C.; continuously circulating residue from the still to a hydrogenation reaction chamber held under a temperature between substantially 350° and 500° C. and at pressure between substantially 100 and 200 atmospheres and continuously circulating the hydrogenation product from said reaction chamber to said still; continuously add-in a portion of the distillate from said still to the residue passing to the reaction chamber in volume to maintain a mixture of fractions having a coke residue not in excess of 24%; and so adjusting the rate of circulation that the distillate from the hydrogenation product shall distill not substantially over 5% at 210° C.

JACQUELIN E. HARVEY, Jr.
ROBERT H. WHITE, Jr.
JOHN J. WHITE.